United States Patent [19]

Rudolph

[11] 4,283,029
[45] Aug. 11, 1981

[54] ACTUATING APPARATUS FOR A FLAP SYSTEM HAVING AN UPPER SURFACE BLOWING POWERED LIFT SYSTEM

[76] Inventor: Peter K. C. Rudolph, 13683 18th Ave. SW., Seattle, Wash. 98166

[21] Appl. No.: 118

[22] Filed: Jan. 2, 1979

[51] Int. Cl.³ .......................... B64C 9/02; B64C 9/16
[52] U.S. Cl. ................................... 244/215; 244/207; 244/216
[58] Field of Search ............... 244/207, 208, 209, 213, 244/215, 216

[56] References Cited

U.S. PATENT DOCUMENTS

| | | | |
|---|---|---|---|
| 2,700,516 | 1/1955 | Nazir | 244/213 |
| 3,987,983 | 10/1976 | Cole | 244/216 |
| 4,120,470 | 10/1978 | Whitener | 244/216 X |

*Primary Examiner*—Barry L. Kelmachter
*Attorney, Agent, or Firm*—Hughes, Barnard & Cassidy

[57] ABSTRACT

A trailing edge flap moveable from a stowed position behind a wing to a downwardly and rearwardly extending position to deflect jet exhaust from an upper surface blowing jet engine downwardly and rearwardly to augment lift. The actuating mechanism rotates the flap about a variable radius which maintains the upper surface of the flap in contact with and generally in tangential alignment with the trailing edge of the upper surface of the wing. This mechanism comprises forward and rear radius links pivotally mounted at their lower ends to a stationary mounting arm, and extending upwardly and divergently therefrom to attach to the flap. In two embodiments, the rear radius link has its pivot end mounted to a moveable member which in turn enables the flap to be rotated so that its forward end moves downwardly. Thus, in its fully deployed position, the flap can be rotated to form a slot between the aft end of the wing and the leading edge of the flap.

16 Claims, 14 Drawing Figures

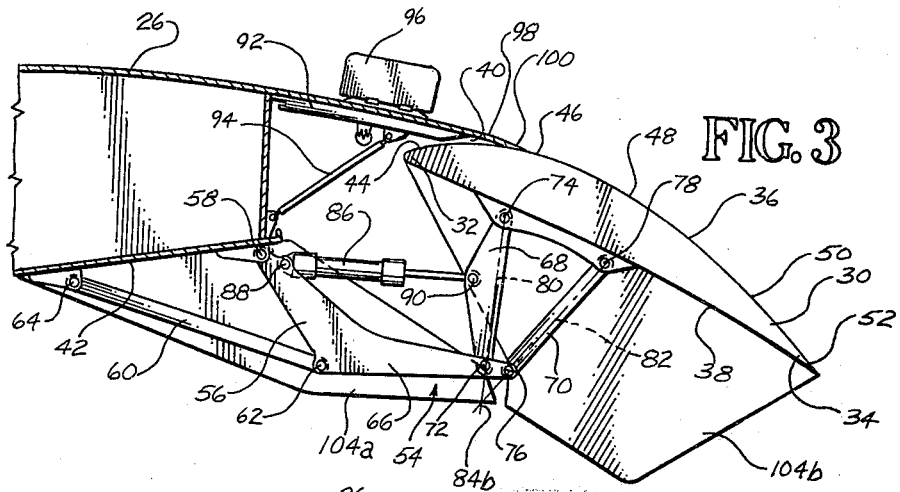
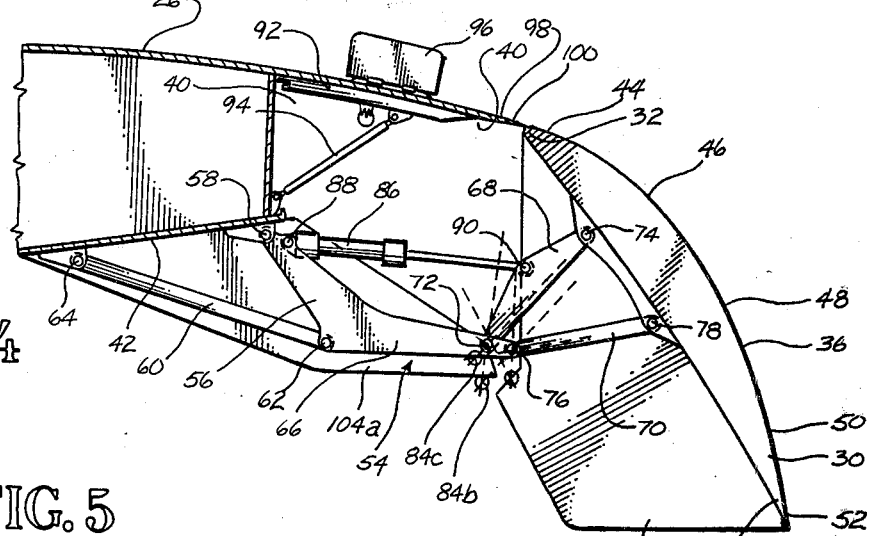
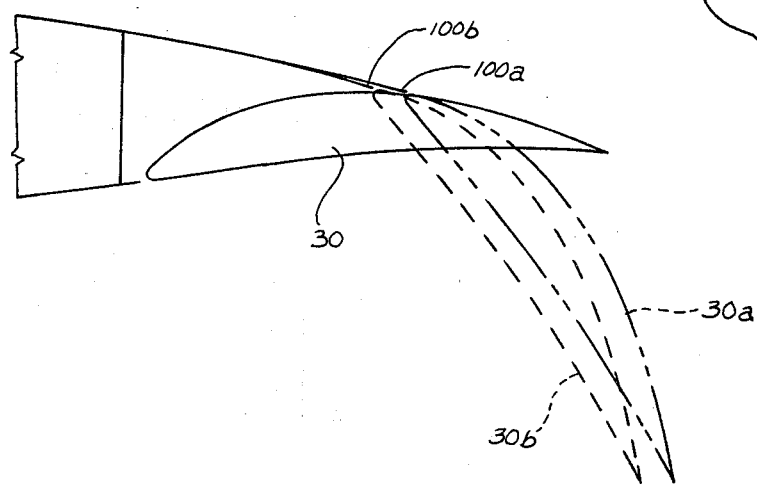

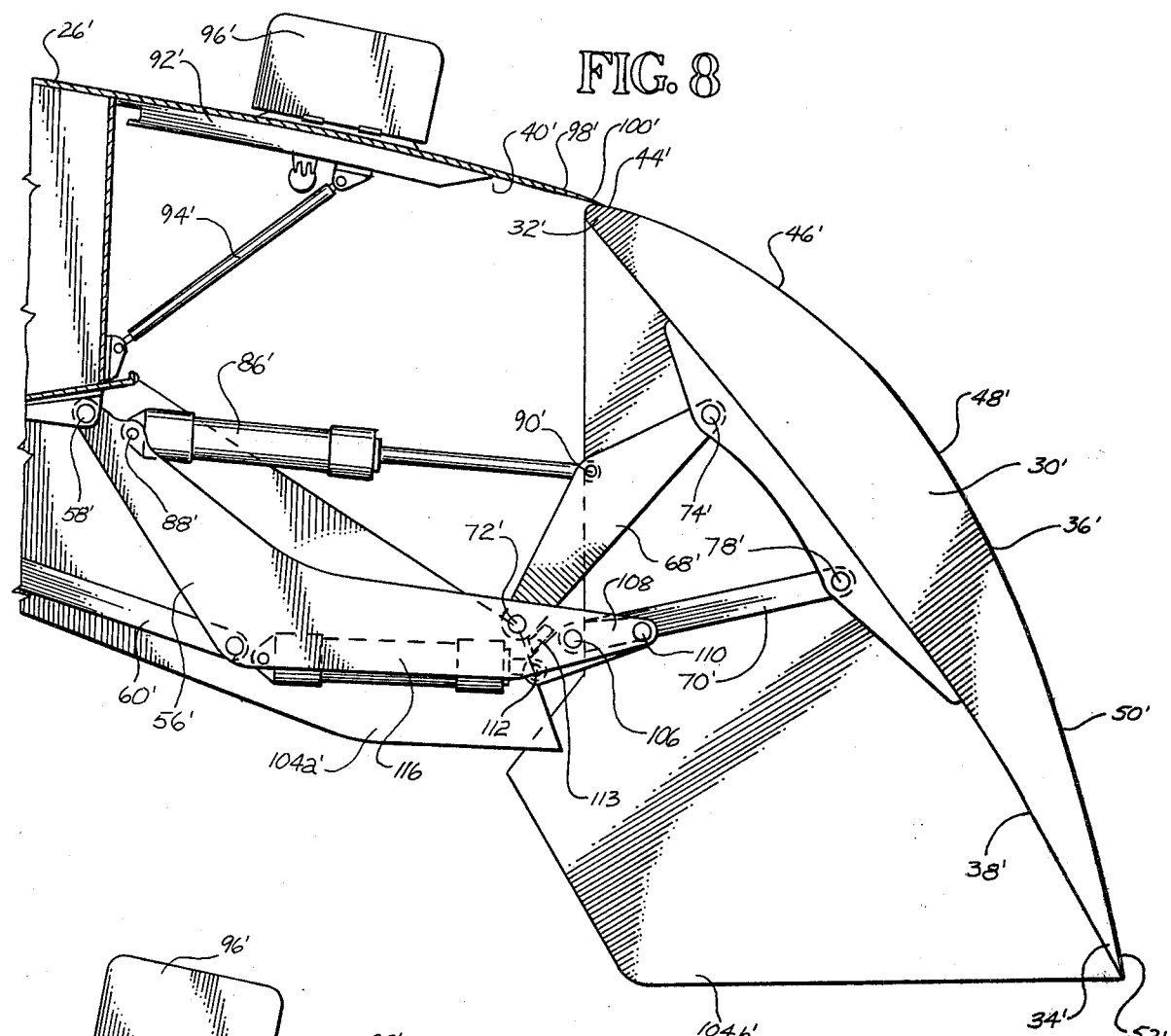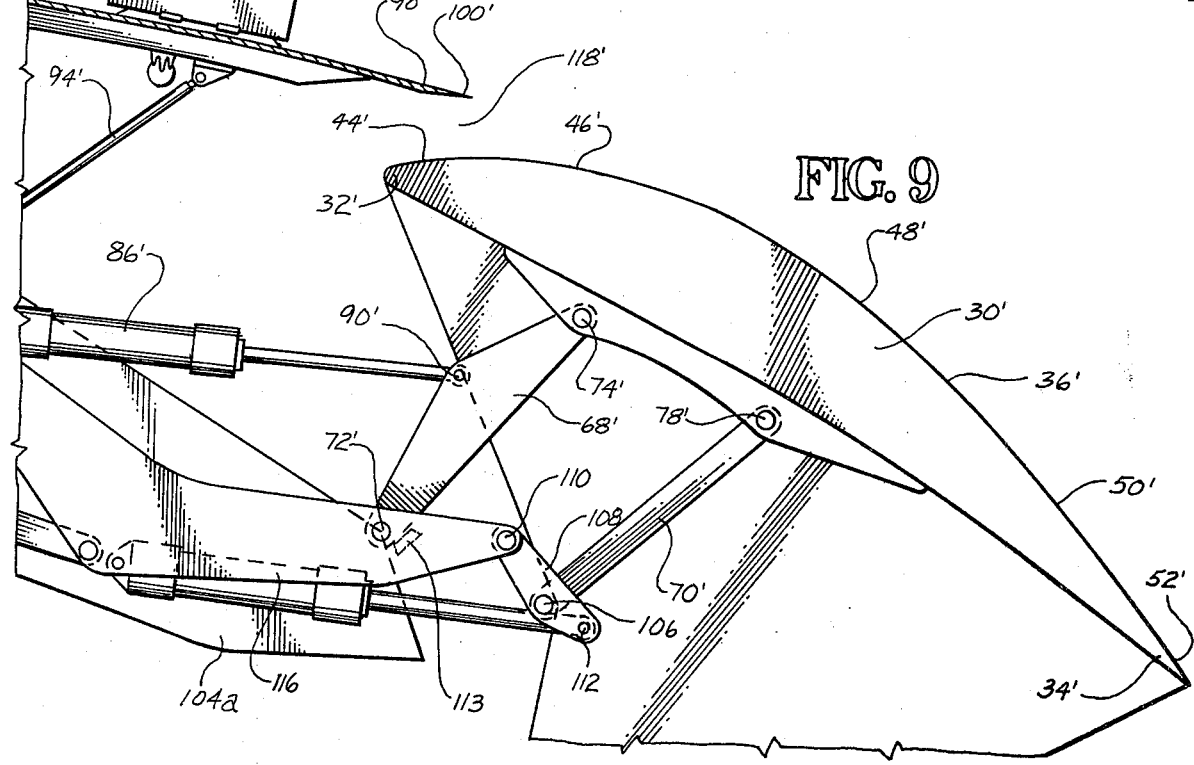

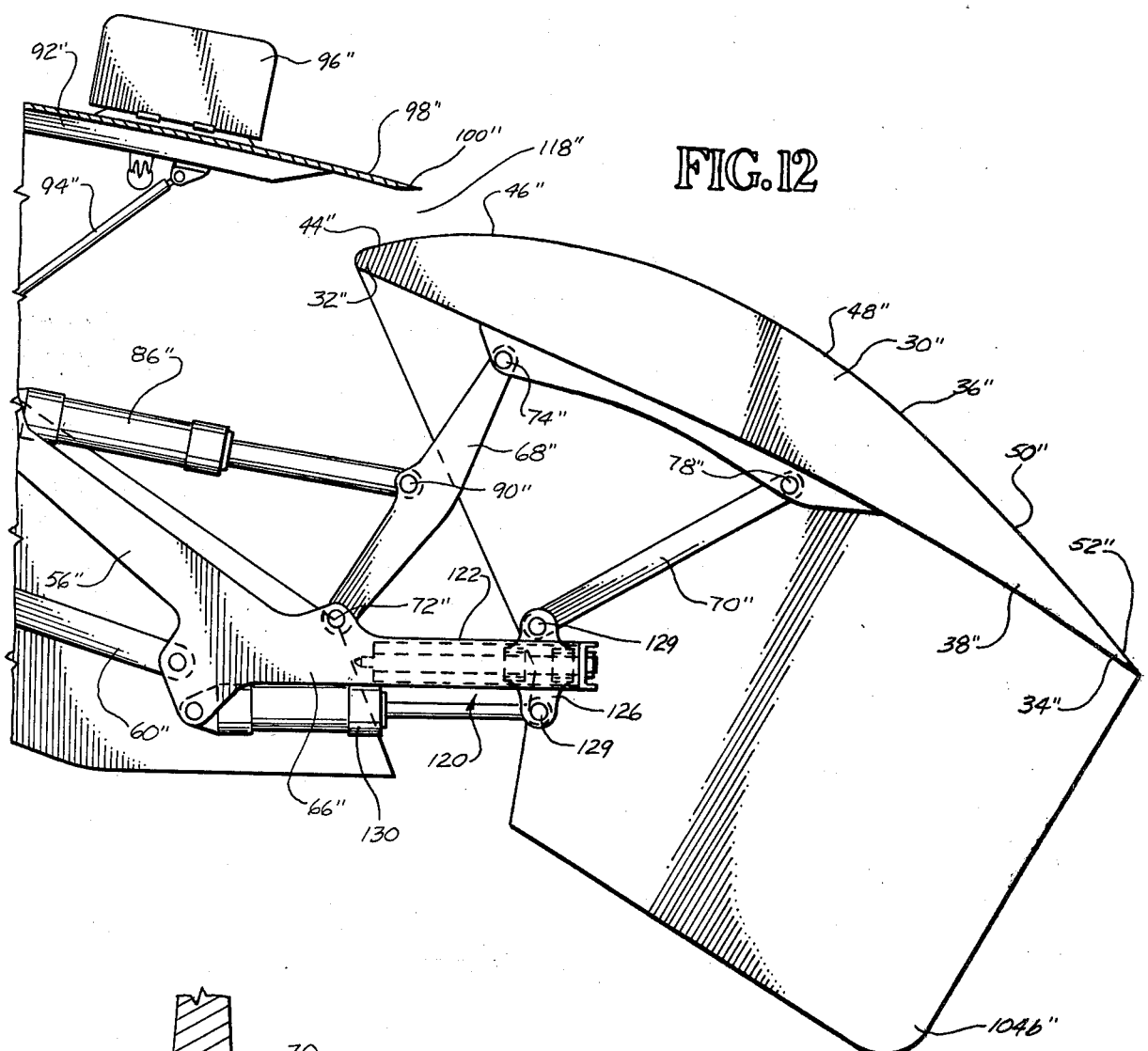
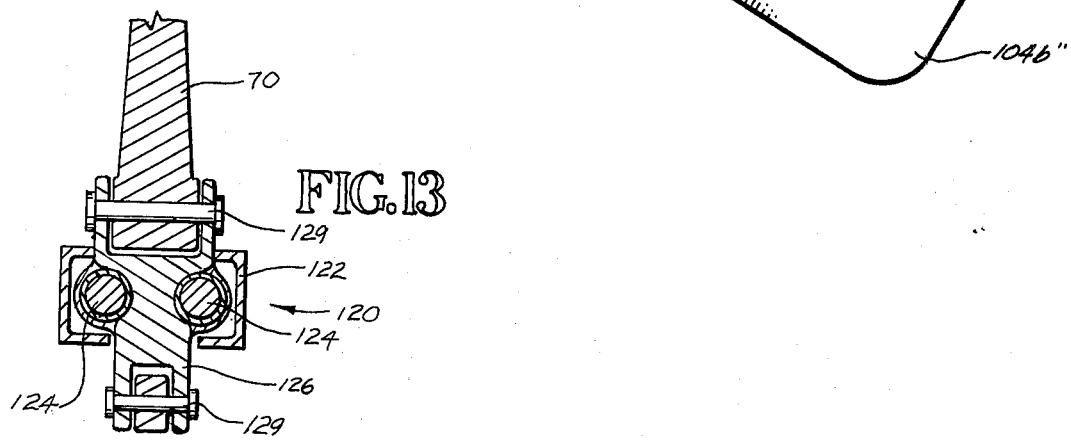

ACTUATING APPARATUS FOR A FLAP SYSTEM HAVING AN UPPER SURFACE BLOWING POWERED LIFT SYSTEM

BACKGROUND OF THE INVENTION

A. Field of the Invention

The present invention relates to an actuating mechanism for a flap system for an aircraft having an upper surface blowing powered lift system.

B. Brief Description of the Prior Art

In recent years, increasing attention has been given to aircraft designs having the capability of efficient cruise at relatively high speeds, and also having the ability to take off and land in relatively short distances. Such airplanes are generally referred to as "STOL aircraft" (i.e. short take-off and landing aircraft). To develop adequate lift for the aircraft at low speed operation, such STOL aircraft commonly utilize the jet exhaust from the engines in combination with a flap system on the wing to divert the exhaust downwardly and thus increase lift.

One method of doing this is by blowing the jet exhaust over the upper surface of the wing, and utilizing downwardly extending trailing edge flaps to divert the exhaust downwardly by the Coanda effect. One such aircraft is shown in U.S. Pat. No. 3,977,630, Lewis et al, this patent being assigned to the assignee of the present invention. In the apparatus shown in that patent there is a high mounted wing, and a pair of mixed flow turbofan engines mounted on the wing to discharge their exhaust streams chordwise over the upper surface of the wing. There is a pair of trailing edge flaps, one behind each engine. The more forward flap of each pair is mounted on a first arm for rotation in a circular arc about a first axis of rotation. The rear flap of each pair is mounted to a second arm which is in turn mounted for rotation in a circular arc about an axis on the first arm which supports the forward flap.

Each pair of flaps has a stowed position where the flaps fit into a cove section at the aft end of the wing, and a deployed position where the two flaps are rotated downwardly and rearwardly. At the forward end of each flap is a small panel, with these panels being able to be moved to an upper position where they form with the upper surface of the wing and the upper surface of the two flaps a continuous aerodynamic surface. These two panels can also be moved to a down position to open slots at the forward ends of their two flaps. Thus, in the event of a loss of power, the panels of the flaps can be moved to the position to open the slots, thus decreasing drag on the wing.

With the two pairs of flaps in their fully deployed position, and with the flap panels closed, they define a downwardly and rearwardly curving aerodynamic surface at the trailing edge of the wing. The jet exhaust being discharged over the upper rear edge of the surface of the right and left wings follows this downwardly aerodynamic contour provided by the two pairs of flaps due to the Coanda effect, to develop a downward thrust.

With regard to the prior art disclosed in other U.S. patents obtained from a search of the patent literature, the following are noted:

U.S. Pat. No. 3,259,341, Steidel, discloses a concept for an airfoil where air is blown from within the wing over the upper surface of a trailing edge flap. The trailing edge flap is mounted for rotation at a location within the forward knee portion of the flap.

U.S. Pat. No. 3,438,599, Welzen, discloses an airfoil with a trailing edge flap which is moveable on a curved track from a stowed to a deployed position.

U.S. Pat. No. 3,614,028, Kleckner, discloses a STOL aircraft where a portion of the efflux from the fan section of a jet engine passes over the wing of the aircraft while the main discharge of the jet engine passes under the wing. The trailing edge flap is utilized to direct the jet flow downwardly for STOL operation. The flap is mounted to rotate about a radius point positioned below the forward knee portion of the flap, and the flap is rotated about this radius point downwardly and away from the trailing edge of the wing to form a slot between the forward end of the flap and the trailing edge of the wing.

U.S. Pat. No. 3,778,009, Jones, discloses a trailing edge device having a pair of members which can be extended or inflated to produce what is described generally as a semicylindrical profile. The forward member is mounted to a track for travel over a curved path.

SUMMARY OF THE INVENTION

The present invention is particularly adapted for use in an aircraft having an upper surface blown flap system. This aircraft comprises an airfoil having a leading edge, a trailing edge, an airfoil chordwise axis, an airfoil upper aerodynamic surface and a rear cove portion with a rear cove edge at a trailing edge of said airfoil aerodynamic surface.

There is a flap member having a forward end, a rear end, a flap chordwise axis, and a flap upper aerodynamic surface. The flap member is moveable between a stowed position in the cove portion of the airfoil when the flap chordwise axis is in general alignment with the airfoil chordwise axis, and a fully deployed positon where the flap member extends downwardly from the rear cove edge.

The upper surface of the flap member has a contact area adapted to remain adjacent the rear cove edge as the flap is moved between its stowed and fully deployed positions. The contact area has a varying radius of curvature which increases rearwardly along the chordwise axis. The contact area has a contact location which is that portion of the contact area adjacent the rear cove edge at any flap position.

The actuating apparatus of the present invention is adapted to move the flap member between its stowed position and its fully deployed position and to intermediate positions between the stowed and fully deployed positions. This is done in a manner that as the flap member rotates rearwardly or forwardly, the upper flap surface is maintained adjacent to and in general aerodynamic alignment with the trailing edge of the airfoil aerodynamic surface.

This apparatus comprises a mounting structure positioned below the flap member in its stowed position. There is a forward positioning link having a lower end pivotally connected to the mounting structure at a lower first forward location and an upper end pivotally connected to the flap member at an upper second forward location. There is a rear positioning link having a lower end pivotally connected to the mounting structure at a lower third rear location and an upper end pivotally connected to the flap member at an upper fourth rear location.

The second and fourth locations are spaced from each other by a first greater distance, while the first and third locations are spaced from each other by a second lesser distance. These are so arranged that with the flap member in its stowed position, the links extend upwardly from the mounting structure divergently from one another.

The first, second, third and fourth locations are so positioned that with the flap member in its stowed position, a first line drawn through the first and second locations and a second line drawn through the third and fourth locations meet at a center point which is an instantaneous center of rotation of the flap member. This instantaneous center of rotation shifts during movement of the flap member between its stowed and deployed positions in a manner to compensate for variations in curvature of the flap surface contact area, so as to maintain the contact location of the contact area in a position adjacent said rear cove edge.

In the preferred form, the first, second, third and fourth locations are so arranged that the instantaneous center of rotation is positioned above a center of curvature of the contact area at the contact location. Further, with the flap member moving from its stowed position toward an intermediate position between the stowed and fully deployed position, the instantaneous center of rotation moves in a direction having a substantial forward component of motion. With the flap member closely approaching its fully deployed position, the instantaneous center of rotation has an upward motion with a substantial vertical component of motion.

With the flap member in its stowed position, the first and second locations are so arranged that the first line which is drawn through the first and second locations slants from the first location upwardly and forwardly, and the second line drawn through the third and fourth locations is more nearly vertical than the first line.

In the preferred form, the airfoil upper aerodynamic surface has an ideal aerodynamic contour, and the cove portion is deflected downwardly at an angle sloping downwardly and rearwardly from the ideal aerodynamic contour to meet the contact area of the upper flap surface at a location forward of a location at which the ideal aerodynamic contour meets the upper surface portion of the flap member.

To provide slatting capability for the flap, there is an intermediate mounting member moveably mounted to the mounting structure. The lower end of one of the links is mounted to the intermediate mounting member in a manner that movement of the intermediate mounting member causes a downward rotation of the forward end of the flap so as to cause the contact area of the upper flap surface to move way from the rear cove portion to form a slot between the airfoil and the flap member.

In one form, the intermediate mounting member is slideably mounted to the mounting member. Specifically, the intermediate mounting member is arranged that rearward slide motion thereof moves the second link rearwardly to cause downward rotation of the forward end of the flap member.

In another form the intermediate mounting member is pivotally mounted to the mounting member. The apparatus further comprises actuating means to move the intermediate mounting member about a pivot mounting thereof in a manner to cause the downward rotation of the front end of the flap member.

In the preferred form of the second configuration of the intermediate mounting member, the intermediate mounting member is mounted to the mounting member at a fifth location so that with the flap in its fully deployed position, the fifth location is positioned below the second line drawn between the third and fourth locations and forward of the third location. The actuating means is so arranged that said intermediate mounting member is moved downwardly to rotate the front end of the flap downwardly. Thus, with the flap in its fully deployed position, aerodynamic forces on the flap tend to pull the intermediate mounting member in a direction opposite to that direction in which the intermediate mounting member moves to rotate the forward end of the flap downwardly. This over center feature prevents the flap member from moving to its slotted position upon failure of the actuating means for the intermediate mounting member.

Other features will become apparent from the following detailed description.

U.S. Pat. No. 3,837,601, Cole, and U.S. Pat. No. 3,987,983, Cole, disclose trailing edge flaps such as that disclosed in the previously discussed U.S. Pat. No. 3,977,630, Lewis et al, patent.

U.S. Pat. No. 3,985,319, Dean et al, discloses a linkage system for a pair of trailing edge flaps. A first pair of connecting links are connected by their upper ends to stationary structure and have their lower swing ends connected to a forward flap member, so that the forward flap member swings downwardly and rearwardly to its deployed position. There is a second flap member similarly mounted by a pair of links to the aft portion of the first flap. In like manner this second flap member can be swung downwardly and rearwardly from its stowed position from its first flap.

BRIEF DESCRIPTION OF THE DRAWING

FIG. 3 is a view similar to FIG. 2, but showing the flap in an intermediate position;

FIG. 4 is a view similar to FIG. 2, but showing the flap in its fully deployed position;

FIG. 5 is a view illustrating two possible flap locations, depending on the deflection of the rear cove panel adjacent the flap;

FIG. 8 is a view similar to FIG. 7, also of the second embodiment, showing the flap in its fully deployed position;

FIG. 9 is a view similar to FIGS. 7 and 8, showing the second embodiment of the present invention with the flap moved to its slotted position;

FIG. 12, is a view similar to FIGS. 10 and 11, also of the third embodiment, showing the flap moved to its slotted position;

FIG. 13 is a sectional view taken along line 13—13 of FIG. 10;

DESCRIPTION OF THE PREFERRED EMBODIMENT

Figure 1:
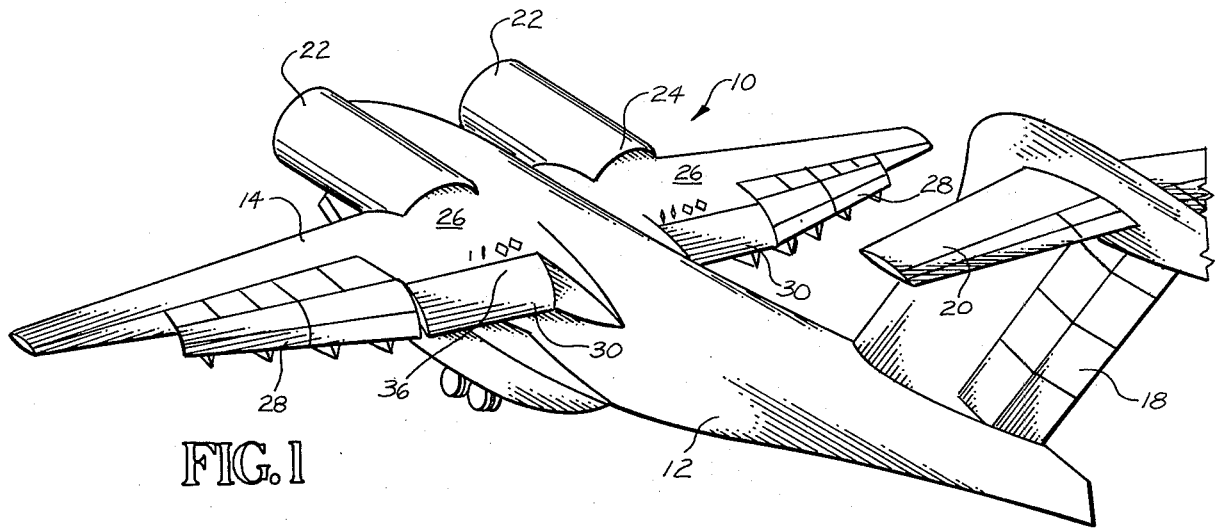
FIG. 1 is an isometric view of an aircraft incorporating an upper surface blown flap for which the actuating mechanism for the present invention is particularly adapted.

It is believed that a clear understanding of the present invention can be obtained by first describing generally the type of aircraft for which the actuating mechanism of the present invention is adapted, and also describing the general operating characteristics of such an aircraft. Such an aircraft 10 is shown in FIG. 1, this aircraft 10 being a STOL aircraft (i.e. short take off and landing aircraft) having an upper surface blowing powered lift system. This airplane 10 comprises a fuselage 12, a high mounted wing 14, and a tail sectional having a rudder 18 and an elevator section 20. There are two engines 22 positioned closely adjacent to and on opposite sides of the fuselage 12. Each engine 22 is mounted to the leading edge of the wing 14, in a manner that the jet exhaust from each engine is discharged through a related rear nozzle 24 over the upper surface 26 of the wing 14. There are two sets of outboard flap systems 28, which are or may be of conventional design.

At inboard locations on the wing 14 there are a pair of trailing edge flaps 30, each of which is located directly downstream of a related engine 22. The apparatus of the present invention serves the function of moving these trailing edge flaps 30 between their stowed and deployed positions.

When it is desired to operate the aircraft in its cruise mode, the flaps 30 (and also the outer flap members 28) are moved into their stowed positions, with the chordwise axes of the flaps 30 and 28 generally aligned with the chordwise axis of the wing 14. The wing is then able to develop adequate lift for cruise mode, with a reasonably high lift over drag ratio. When the airplane 10 is landing, the outer flap members 28 are rotated downwardly in a conventional manner to augment lift for lower speed of the aircraft. The flaps 30 are also rotated downwardly and rearwardly, but function in a somewhat different manner. Each flap 30 provides an upper aerodynamic surface which directs the jet exhaust which has travelled over the wing surface 26 in a downward and rearward direction, thus using the jet exhaust itself to augment lift. The phenomenon by which this turning is accomplished is commonly known as the Coanda effect.

The apparatus of the present invention was designed to be used in conjunction with a set of trailing edge flaps 30 having a particular configuration, this being described and claimed in a co-pending U.S. patent application, filed concurrently with the present application and entitled "Upper Surface Blown Powered Lift System For Aircraft And Method of Utilizing The Same" Ser. No. 000,116, filed Jan. 2, 1979, assigned to the same assignee as the present invetion, the inventor being Timothy Wang. To review generally the main features of that flap configuration, reference is made to FIG. 2, which shows the flap 30 in its stowed position. The flap member 30 has a forward knee portion 32, a trailing edge portion 34, an upper aerodynamic surface 36, and a lower surface 38. The flap 30 is stowed in a "cove portion" 40 at the rear end of the wing 14. In the stowed position, the lower surface 38 is generally aligned with the lower aerodynamic surface 42 of the wing 14, and the rear portion of the upper flap surface 36 extends rearwardly from and is generally aligned with the upper aerodynamic surface 26 of the wing 14, with the forward portion of the upper flap surface 26 being positioned within the cove 40 of the wing 14.

For purposes of analysis, consideration will be given to five locations along the chordwise length of the upper surface 36 of the flap 30, these five locations being: the most forward location 44 immediately adjacent the forward end 32; an intermediate forward location 46 midway along the forward part of the surface 36; a transition location 48 where the flap surface 36 meets the trailing edge of upper wing surface 26 when the flap 30 is in its stowed position; an intermediate rear location 50 at the midlength of the rear part of the flap surface 36; and a rear location 52 immediately adjacent the trailing edge 34 of the flap 30. The flap surface 26 is so contoured that the radius of curvature of the surface 36 is at a minimum at the location 44, and increases in a logarithmic spiral contour to the transition location 54. Thereafter the radius of curvature is dictated primarily by the aerodynamic configuration of the upper wing surface 26 so that the radius of curvature would be substantially greater between the locations 48 and 52.

The apparatus of the present invention is designed to move the flap 30 from its stowed position (shown in FIG. 2) through intermediate positions (one of which is shown in FIG. 3) to its fully deployed position (shown in FIG. 4), in such a manner that the flap upper aerodynamic surface 36 stays in contact with the trailing edge of the upper wing surface throughout the motion. When the flap member 30 has reached its fully deployed position, as shown in FIG. 4, the aerodynamic contour provided by the wing 14 and the flap member 30 is such that the radius of curvature at the location immediately aft of the trailing edge of the wing surface 26 is at a minimum.

It has been found that the particular contour of the upper surface 26 of the flap 30 has several advantages. First, in comparison with prior art upper suface blown flaps which have a substantially constant radius of curvature, the flap 30 of the present invention can produce an equivalent lifting force, with substantially less flap area. Second, the flap 30 is better able to vary the drag coefficient of the wing for a given change in angular position of the flap 30, thus improving control characteristics of the aircraft. Third, the pitching moment developed by the flap 30, is smaller than the conventional trailing edge flap of substantially constant curvature and the cost and weight of this single segment expanding radius flap is considerably lower than the two segment constant radius state of the art upper surface blown flap. Also, the size of the flap actuating mechanism is smaller than on the state of the art constant radius upper surface blown flap, thus resulting in a considerably smaller flap support fairing with lower cruise drag.

Figure 2:
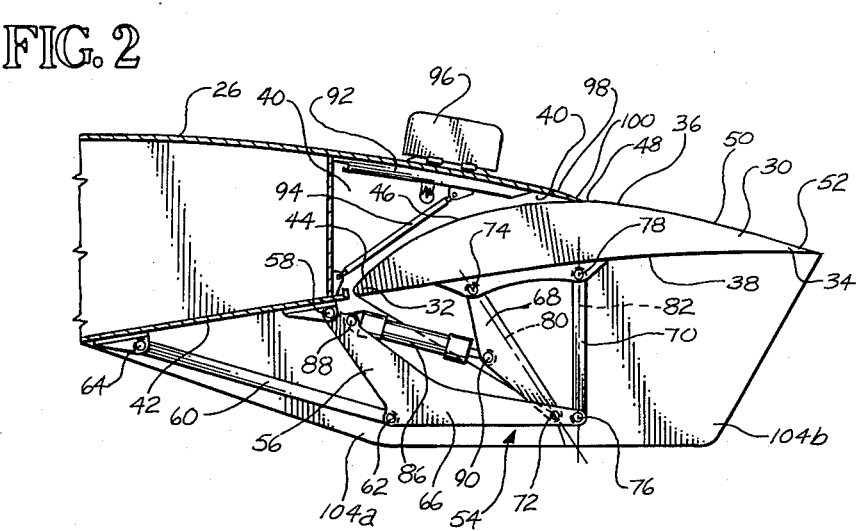
FIG. 2 is an sectional view taken along a cordwise axis of a wing to which the actuating mechanism of a first embodiment of the present invention is mounted, with the flap shown in its stowed position.

Reference is now made to FIGS. 2,3, and 4 to describe the first embodiment of the actuating mechanism of the present invention, generally designated 54. This actuating mechanism 54 comprises a mounting arm 56 connected at its upper forward end at 58 to the lower rear part of the wing 14. To hold the arm 56 in a fixed position, there is provided a rigid link 60, connected at its rear end at 62 to a middle portion of the arm 56, and connected at its forward end 64 to the bottom side of the wing 14 at a location forwardly of the connecting point 62. The mounting arm 56 has a rearwardly extending portion 66 which is positioned a moderate distance below the cordwise axis of the wing 14.

To mount the flap 30 to the rear arm portion 66, there are provided two radius links, namely a forward link 68 and a rear link 70. The forward link 68 has its lower end pivotally connected to the arm portion 66 at a first forward pivot location 72 and its upper end pivotally connected to the underside of the flap 30 at a forward second location 74. The rear radius link 70 has its lower end connected to the rear arm portion 66 at a third pivot location 76, which location 76 is spaced rearwardly a moderate distance from the first location 72. The upper end of the rear radius link 70 is pivotally connected to the underside of the flap 30 at fourth pivot location 78, spaced rearwardly of the second location 74. The spacing of the first and third locations 72 and 76 is substantially less than the spacing of the two upper locations 74 and 78, so that with the flap 30 in the stowed position shown in FIG. 2, the two radius links 68 and 70 extend upwardly from their lower pivot location 72 and 76 divergently to their upper pivot locations 74 and 78.

In the particular arrangement shown herein, the axis 80 of the forward radius link 68 (this axis being a line extending through the two connecting locations 72 and 74) extends through the flap upper surface 36 at a location moderately forward of the location 46, which as described previously, is at approximately the midlength of the forward portion of the surface 36. Also, with the flap 30 in its stowed position, this axis 80 of the forward radius link 68 makes an angle moderately less than a right angle with a line tangent to the flap upper surface 36 at the location of the intersection of the axis 80 and the flap upper surface 36, and extends forwardly with a slant greater than that of the axis 82 of the rear link 70.

The axis 82 of the rear radius link 70 passes through the two connecting locations 76 and 78. With the flap in its stowed position, as seen in FIG. 2, the rear radius link axis 82 passes through the flap upper surface 36 at approximately the middle location 48, and makes an angle with a line drawn tangent to and forwardly from the surface 36 at the point of intersection of the axis 82 and the flap upper surface 36 moderately less than a right angle. The two radius link axes 80 and 82 intersect at a point 84a which is moderately below the two lower pivot connecting locations 72 and 76. This point 84a is the instantaneous center of rotation for the flap member 30 when it is in its stowed position shown in full lines in FIG. 2.

An actuating member, in the form of a hydraulic jack 86, is connected by its forward end at 88 to an upper forward portion of the mounting arm 56 and by its rear end at 90 to the forward radius link at 68 about the midlength thereof. This hydraulic jack 86 is extended to move the flap 30 rearwardly toward its deployed position, and is retracted to bring the flap member 30 back to its stowed position.

At the rear end of the upper aerodynamic surface 26, there is a rigid cove panel 92. A diagonal link 94 is connected to the cove panel and to the structure of the wing 14 to maintain the cove panel 92 in a fixed position. One or more vortex generators 96 are mounted to the upper aerodynamic surface 26 at the location of the panel 92.

The rear portion 98 of the cove panel 92 is made of a moderately flexible resilient material which is spring loaded in a downward direction so that the extreme rear end 100 of the rear cove portion 98 is pressed downwardly into sliding contact with the upper flap surface 36. In the particular arrangement shown in the FIG. 2 with the flap 30 in its stowed position, the cove trailing edge portion 98 is very slightly below what would be considered the ideal aerodynamic contour extending from the surface 26 to the surface 36, with such ideal contour being indicated in broken lines at 102. (This can be seen in FIG. 14.) However, this slight deviation from the contour line 102 is of minimal significance with respect to possible alteration of the airflow over the surfaces 26 and 36 during cruise.

The actuating components for the flap 30 are enclosed in a suitable fairing, having a forward section 104a and a rear section 104b. The forward section 104a is attached to the lower side of the wing, while the rear section 104b is connected to the lower side of the flap 30. When the flap 30 rotates to its various deployed positions, the two fairing sections 104a and 104b simply separate from one another, as shown in FIG. 3.

To describe the operation of the present invention, when the airplane 10 is in its cruise mode, the flap 30 is in its stowed position so as to form with the wing 14 a low drag profile. When the airplane 10 is in its STOL mode of operation, the hydraulic jack 86 is extended to move the flap member 30 downwardly and rearwardly. In the present invention this is done in such a manner that even though the radius of curvature of the flap surface 36 decreases in a forward direction, that portion of the flap surface 26 which is immediately adjacent to the rear end 100 of the cove panel 92 does not shift vertically to any significant extent. Further, that portion of the flap surface 36 adjacent the rear cove panel portion 100 becomes more and more tangent to the aerodynamic surface 26 at the location of the rear panel portion 100 as the flap 30 moves towards full deployment.

FIG. 3 shows the flap 30 in an intermediate position approximately midway between the stowed position and fully deployed position. In that position, it can be seen that the two axes 80 and 82 of the forward and rear radius links 68 and 70 have rotated about their respective pivot locations 72 and 76, so that the intersection of these two axes 80 and 82 intersect at point 84b, which is the instantaneous center of rotation when the flap 30 is in its intermediate position shown in FIG. 3. Thus, it can be appreciated that as the flap moves from the stowed position shown in full lines in FIG. 2 to the middle intermediate position shown in FIG. 3, the center of rotation of the flap 30 shifts mainly forwardly from the location 84a to the location 84b. However, it will be noted that even through the radius of curvature from the location 48 to 46 decreases, there is virtually no deflection of the cove rear portion 100.

The flap 30 in its fully deployed position is shown in FIG. 4. In this position, it can be seen that the two axes 80 and 82 of the forward and rear radius links 68 and 70, have shifted to the extent that the instantaneous center of rotation has shifted upwardly to a moderate extent to location 80c to be closely adjacent to the pivot location 72 of the forward radius link 68. Thus, it can be appreciated that as the flap 30 moves from the middle intermediate position (shown in FIG. 3) to the full deployed position shown in FIG. 4, as the radius of curvature of the upper flap surface adjacent the rear cove end 100 decreases, the instantaneous center of rotation moves upwardly from 84b to 84c to maintain that surface portion 36 adjacent the cove end 100 at the same vertical location. The manner in which the components are arranged to accomplish these functions quite effectively will be described later herein with reference to FIGS. 14, 5 and 6.

Figure 7:
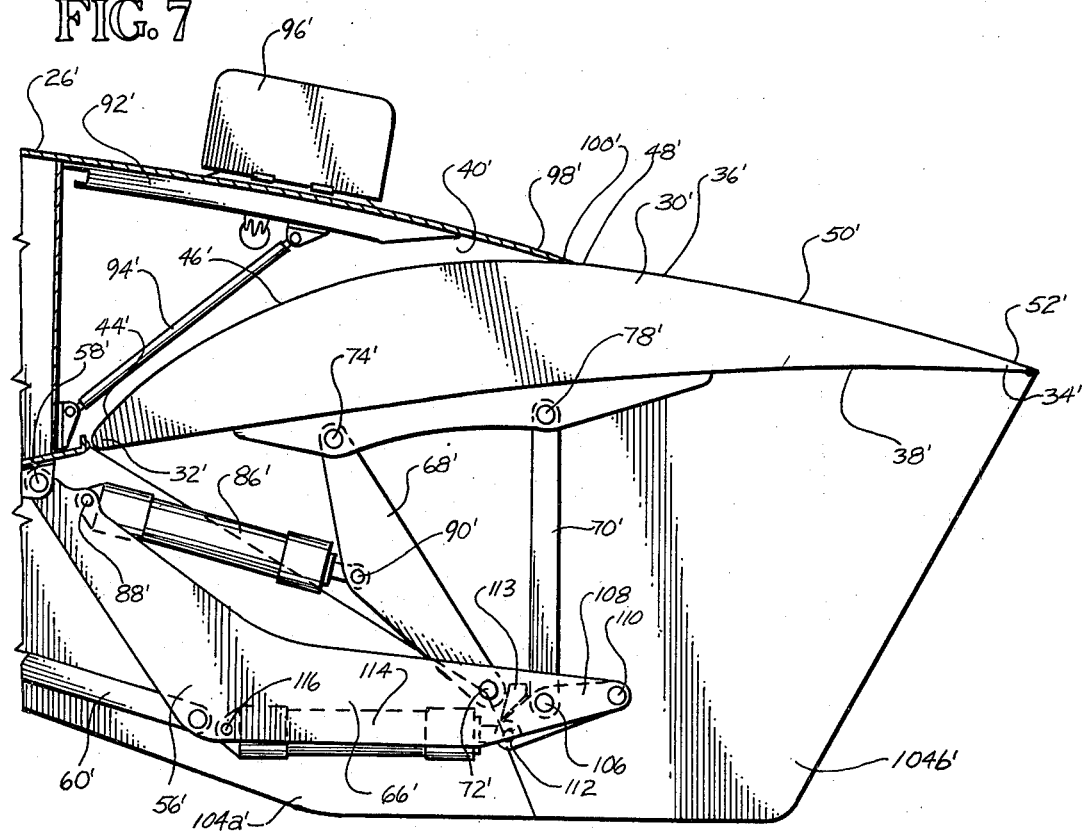
FIG. 7 is a view similar to FIG. 2, but showing a second embodiment of the actuating mechanism of the present invention.

A second embodiment of the present invention is shown in FIGS. 7-9. In describing the second embodiment, components of the second embodiment similar to the first embodiment will be given like numerical designations, with prime (') designations distinguishing those of the second embodiment.

The second embodiment shown in FIGS. 7-9 differs from the first embodiment shown in FIGS. 2-4 in only one major respect, and that is in the manner of mounting the rear radius link 70' to provide slotting capability for the flap 30' in its deployed position. Thus, it can be seen that, as in the first embodiment, there is a flap 30', having a forward knee portion 32', a trailing edge portion 34', an upper aerodynamic surface 36' and a lower surface 38'. There is a main mounting arm 56' to which are mounted forward and rear radius links 68' and 70'. A hydraulic jack 86' is connected from the forward end of the mounting arm 56' to the forward radius link 68'. The forward radius link 68' is connected directly to the flap 30' at an upper location 74' and pivotally connected to the arm 56' at a lower location 72'.

As indicated above the main difference in the present invention is the mounting of the rear radius link 70'. The upper end of the link 70' is directly connected pivotally to the flap 30 at 78' as in the first embodiment. However, at its lower end, the radius link 70' is pivotally connected at 106 to an intermediate pivot link 108. This pivot link 108 is in turn connected by a pivot end thereof at 110 to the rear end of the mounting arm 66'. The forward end of the pivot link 108 is connected at 112 to the rear end of a hydraulic jack 114, and the forward end of the hydraulic jack 114 is connected at 116 to the mounting arm 56'.

To describe the operation of this second embodiment, reference is first made to FIG. 7-9. During normal operation, the hydraulic jack 114 remains retracted so that the pivot link 108 remains stationary. Thus, when the flap 30' is moved between its stowed position shown in FIG. 7, to its fully deployed position, shown in FIG. 8, and to intermediate positions (not shown herein for convenience of illustration), the mode of operation is substantially the same as that described with reference to the first embodiment in FIGS. 2, 3, and 4. In other words, the flap 30' rotates rearwardly and downwardly in a manner that its upper surface 36' remains adjacent to the upper aerodyanamic surface 26' at the cove rear end 100'. Thus the link 108 is so positioned that the connecting location 106 is positioned at the same place as the connecting location 76 of the first embodiment, and pivot location 110 of the link 108 is spaced moderately rearwardly of the location 106. During normal flap operation link 108 is pressed against a stop 113, mounted on the mounting arm 66', which stops the link 108 from rotating in an upward direction. The loads on the aft link 70' are tension loads throughout the flap deployment range. Since the aft link 70' pulls up on link 108 forward of pivot point 110, and at a location above the axis 82, link 108 is always pulled against the stop 113, thus making link 108 a failsafe over center link.

The function of the pivot link 108 is to provide slotting capability for the flap 30' when the flap 30' is in its deployed position. Thus, when the flap 30' is in or near fully deployed position, and there is a power loss so that it is desired to reduce drag and reconfigure the upper surface blown flap into a slotted aerodynamic flap, the jack 114 is extended to rotate the link 108 downwardly and rearwardly about its pivot connection 110. This has the effect of moving the rear radius link 70' in a manner to lift the trailing edge 34' of the flap 30' upwardly and rotate the flap leading edge 32' downwardly, thus providing a slot 118 between the cove trailing edge 100' and the flap upper aerodynamic surface 36'.

A third embodiment of the present invention is shown in FIGS. 10-13. Components of this third embodiment which are similar to components of the first two embodiments will be given like numerical designations, with a double prime (") distinguishing those of the third embodiment. This third embodiment is substantially the same as the second embodiment, except for the manner in which the rear radius link 70" is mounted at its lower rear end to moveable structure. Since the other main components are substantially the same as in the first two embodiments and function in moving the flap 30" through its various deployed positions in substantially the same manner as in the first two embodiments, the main components of this third embodiment will not be described herein. Rather, in the accompanying drawing these will simply be given numerical designations corresponding to those of the first embodiment.

To proceed to a description of the distinguishing features of this third embodiment, the lower rear end of the arm 56" is formed as a slideway 120, generally aligned with the cordwise axis of the wing 14". More precisely, this slideway 120 comprises a housing 122 in which are positioned two parallel rods 124. A slide element 126 is mounted to the rods 124. The lower end of the slide element 126 connected at 129 to the rear end of a hydraulic jack 130 having its other end connected to the arm 56".

Figure 10:
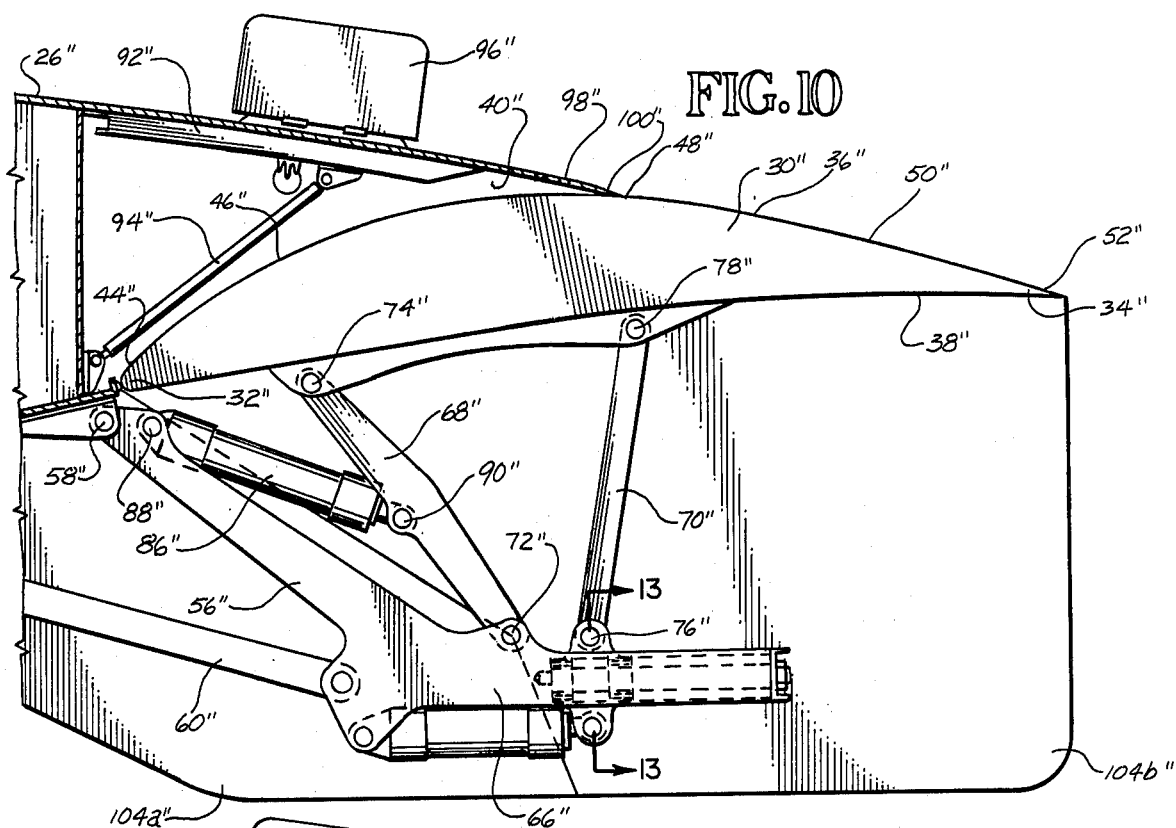
FIG. 10 is a sectional view of a third embodiment of the actuating mechanism of the present invention, with the flap shown in its stowed position.
Figure 11:
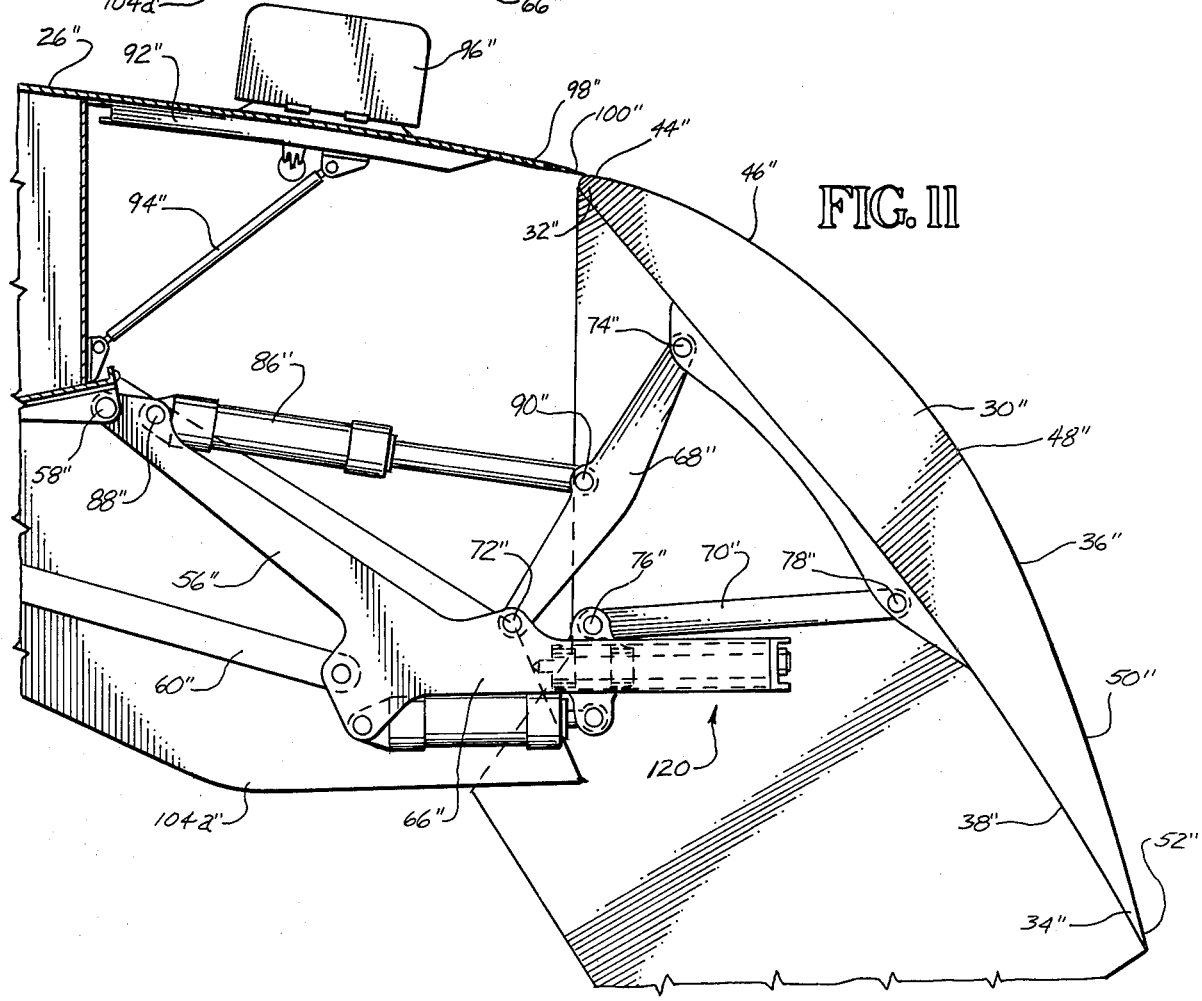
FIG. 11 is a view similar to FIG. 10, also of the third embodiment of the present invention, showing the flap in its fully deployed position.

To describe the operation of this third embodiment, reference is first made to FIGS. 10 and 11. It can readily be seen from a review of the previous description of the first embodiment, and from an examination of FIGS. 10 and 11, that the flap 30" is moved from its stowed position in FIG. 10 to its fully deployed position in FIG. 11 in substantially the same manner as in the first and second embodiments.

With reference to FIGS. 11 and 12, it can be seen that the flap 30" is moved to its slotted position (shown in FIG. 12) in a somewhat different manner than in the second embodiment. With the flap 30" in its fully deployed position (shown in FIG. 11), if it is desired to provide a slot 118", the hydraulic jack 130 is extended to move the slide element 126 rearwardly. This causes the rear radius link 70" to move rearwardly in a manner to rotate the flap 30" about the upper forward pivot location 74" in a manner that the forward knee end 32" of the flap 30" rotates downwardly to form the slot 118". As indicated earlier, the flap 30" is moved to its slotted position to reduce drag in the event of a power failure and to provide aerodynamic lift by opening a slot.

Figure 14:
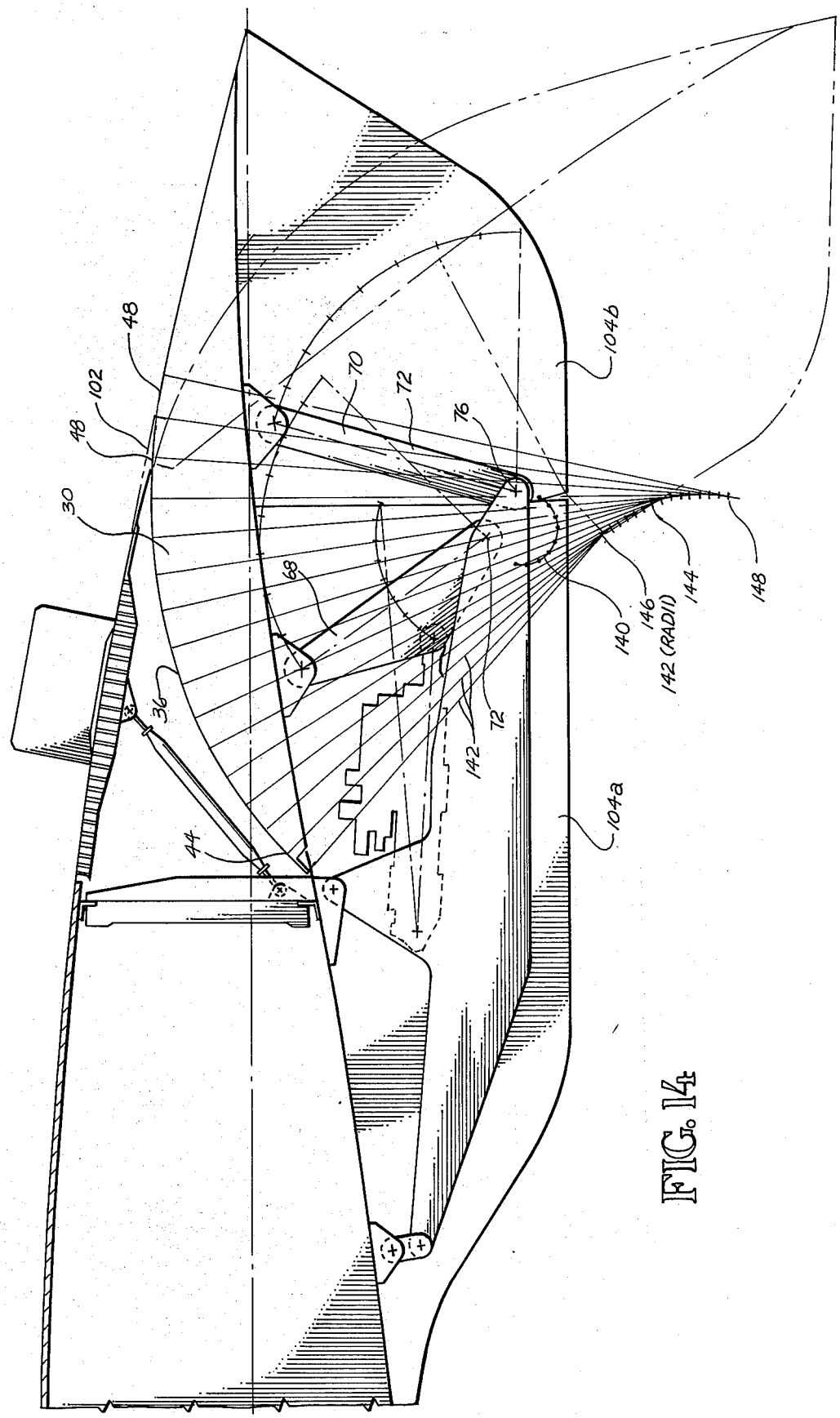
FIG. 14 is a sectional view of the first embodiment illustrating the movement of the instantaneous center of rotation and the radii of curvature of the upper flap surface.

To explain further the manner in which the components of the present invention co-operate with one another, reference is now made to FIG. 14, which shows an actuating system nearly indentical to that shown in FIGS. 2-4, but with the sizing and positioning of the components modified slightly to improve the precision of the operation. Since the components of FIG. 14 are substantially the same as those shown in FIGS. 2-4, the same numerical designations will be used. It will be noted that in FIG. 14, the length and relative position of the two positioning links 68 and 70 has been modified from FIGS. 2-4 so that the center of rotation 72 of the link 68 is moderately above the center of rotation 76 of the link 70.

The movement of the instantaneous center of rotation of the flap 30 in moving from its stowed position (shown in full lines in FIG. 14) to its fully deployed position (shown in broken lines in FIG. 14) is indicated at 140. It can be seen that the path of this instantaneous center of rotation is nearly a circular arc of almost 180°. Initially the center of rotation moves downwardly and forwardly, then upwardly and forwardly, and in the final movement of the flap 30 to its fully deployed position, the center of rotation moves almost straight up.

Also, the varying radius of curvature of the forward portion of the upper flap surface 36 (that portion between the locations 44 and 48) is illustrated in FIG. 14 as a plurality of radii indicated generally at 142. It can be seen that the radii at various locations increase in length as one travels progressively rearwardly along the forward portion of the flap surface 36. The various radii centers (i.e. the centers of curvature at the points from which the radii 142 are drawn) lie on a curve 144, the upper end of which is at 146, and the lower end of which is at 148. The point 146 is the center of the curvature at the location 44 on the flap surface 36, while the point 148 is the center of curvature at a location quite close to location 48.

As indicated previously, the trailing edge 100 of the rear cove plate 98 is shortened moderately and moved downwardly from the desired aerodynamic configuration 102. This discontinuity between the aft and 100 of the cove panel 98 and the flap upper surface 36 in the fully deployed position is quite significant. The trailing edge of the cove panel 98 is sloped downwardly 3° to 5° as compared to the ideal aerodynamic wing contour 102. Thus, when the flap 30 is deflected fully down, the trailing edge 100 of the cove panel 98 starts to turn the flow downward by 3° to 5°, and since the leading edge of the flap 44 is tangential to this trailing edge portion 100, there is an additional 3° to 5° flow turning in the jet flow before the jet flow reaches the location of the flap upper surface 36.

This particular feature is illustrated with reference to FIG. 5, where the flap 30 is shown in two positions, 30a and 30b. The flap 30a represents the location of the flap 30 if the trailing edge 100 of the cove panel were extended further rearwardly as at 100a to match the desired contour 102 more precisely. The flap 30b represents the location with the cove panel trailing edge at 102b, which is the preferred location shown in FIG. 14. It can be seen that with the cove panel 98 being shortened and deflected downwardly (as shown in FIG. 14), it is possible to achieve a greater downward deflection of the flap 30 (as indicated at 30b), and also possible to deploy the flap 30 to its full down position at a more forward location. This in turn causes the center of lift developed by the flap 30 in its full down position to be shifted forwardly, thus reducing the airplane pitching moment during flaps down operation.

There is yet another advantage to the shortening and downward positioning of the trailing edge 100 of the cove panel 98. As the flap 30 is moved from the stowed position to the full deployed position the angular discontinuity between the flap surface 36 and the cove panel trailing edge 100 is reduced, which in turn means that there is greater rotation of the flap 30 for a given amount of linear travel at the point of contact with the cove panel trailing edge 100. Also, the leading edge 44 of the flap 30 has to translate linearly a shorter distance. The additional rotation and reduced translation of the flap 30 tightens up (i.e. shortens) the radius about which the flap 30 rotates. Thus, the two links 68 and 70 can be made yet shorter than they would be if the cove trailing edge 100 were extended and raised to match the aerodynamic contour 102. This can be seen in FIG. 6, where the links 68 and 70 are shown at 68b and 70b in the situation where the flap 30b is matching the shortened and downwardly deflected cove trailing edge at 100b. It can be seen that the centers of rotation of the links 68b and 70b are at 72b and 76b respectively.

Figure 6:
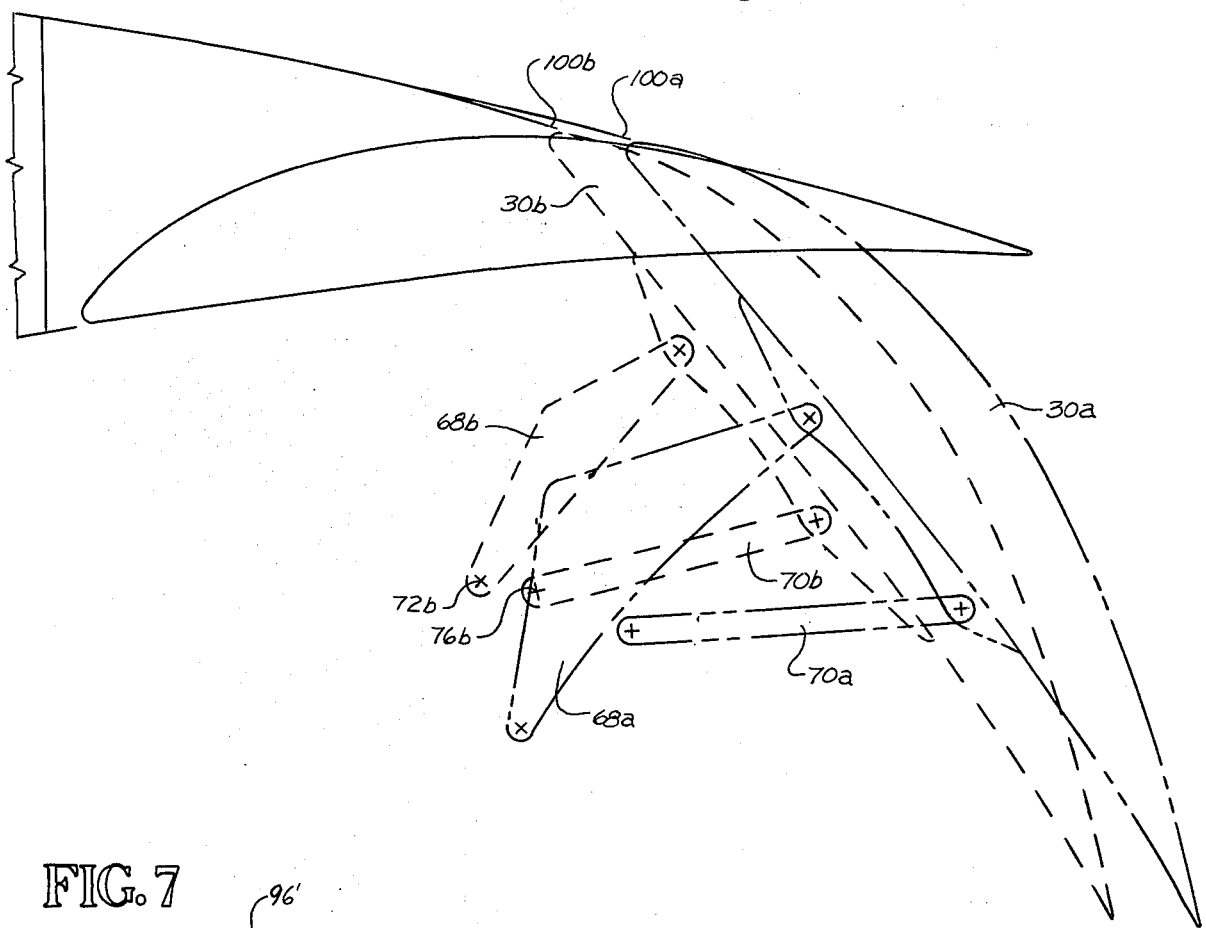
FIG. 6 is a view similar to FIG. 5, illustrating the arrangement of the linkage for the two flaps in the two locations.

However, when the flap 30 is positioned (as shown in FIG. 6) at 30a, so as to be in contact with a cove trailing edge 100a that is extended and positioned upwardly so as to match the aerodynamic contour 102, it can be seen that the flap 30a is positioned further rearwardly from the flap 30b and also at a moderately smaller angle of slant. To determine what the flap positioning at 30a in FIG. 6 would require, an analysis was performed to locate the links 68 and 70, and these locations are shown at 68a and 70a. It can be seen that the links at 68a and 70a would be a substantial distance further below the flap 30. Thus, it can be seen that by locating the cove trailing edge 100 at the position 100b instead of the position 100a, the length of the links 68 and 70 (and therefore the weight) is reduced, and the depth of the flap support fairing is reduced so as to reduce cruise drag.

Thus, when the flap 30 is initially moving from its stowed position to moderate downward deflections, the center of rotation is moving forwardly, while the center of radius of curvature at the location of the cove trailing edge 100 moves upwardly. When the flap 30 is moving more closely to full downward deflection, the movement of the center of radius of curvature at the cove trailing edge 100 are both moving nearly vertically. The maching of these movements results in substantially no vertical movement of the cove trailing edge 100, and also provides for proper matching of surface contours of the flap surface 36 and cove trailing to remove the angular discontinuity that is present at the cove trailing edge 100 when the flap 30 is in the stowed position.

What is claimed:
1. In an aircraft having:
 a. an airfoil having a leading edge, a substantially non-adjustable trailing edge, an airfoil chordwise axis, an airfoil upper aerodynamic surface and a rear cove portion with a rear cove edge at a trailing edge of said airfoil aerodynamic surface,
 b. a flap member having a forward end, a rear end, a flap chordwise axis, and a flap upper aerodynamic surface, said flap member moveable between a stowed position in the cove portion of the airfoil with the flap chordwise axis being in general alignment with the airfoil chordwise axis, and a fully deployed position where the flap member extends downwardly from the rear cove edge,
 c. said flap upper surface having a contact area adapted to remain adjacent said rear cove edge as the flap member is moved between its stowed and fully deployed positions, said contact area having a varying radius of curvature which increases rearwardly along said chordwise axis, and a contact location which is that portion of the contact area adjacent the rear cover edge at any flap position, an actuating apparatus adapted to be used in conjunction with an upper surface blown powered lift system for said aircraft to move said flap member between its stowed position and its fully deployed position to intermediate positions between the stowed and fully deployed positions, in a manner that as the flap member rotates rearwardly or forwardly the upper flap surface is maintained in substantially constant contact with and in general alignment with the trailing edge of the airfoil aerodynamic surface, said actuating means comprising:

a. a mounting structure positoned below said flap member in its stowed position, b. a forward positioning link having a lower end pivotally connected to said mounting structure at a lower first forward location and an upper end pivotally connected to said flap member at an upper second forward location, c. a rear positioning link having a lower end pivotally connected to said mounting structure at a lower third rear location and an upper end pivotally connected to said flap member at an upper fourth rear location, d. said second and fourth location being spaced from each other by a first greater distance, and said first and third locations being spaced from each other by a second lesser distance, in a manner that with said flap member in its stowed position, said links extend upwardly from said mounting structure divergently from one another, e. said first, second, third and fourth locations being so positioned that with said flap member in its stowed positon, a first line drawn through said first and second locations and a second line drawn through said third and fourth locations meet at a center point which is an instantaneous center of rotation of said flap member, and said instantaneous center of rotation shifts during movement of said flap member between its stowed and deployed positions in a manner to compensate for variations in curvature of the flap surface contact area, so as to maintain the contact location of said contact area in a position adjacent said rear cove edge, f. the actuating apparatus being characterized in that the actuating apparatus itself provides main compensation for the curvature of the upper flap surface.

2. The apparatus as recited in claim 1, wherein said first, second, third and fourth locations are so arranged that said instantaneous center of rotation is positioned above a center of curvature of said contact area at said contact location.

3. The apparatus as recited in claim 2, wherein said first, second, third, and fourth locations are so arranged that with said flap member moving from its stowed position toward an intermediate position between said stowed and fully deployed position, said instantaneous center of rotation moves in a direction having a substantial forward component of motion, and with said flap member closely approaching its fully deployed position, said instantaneous center of rotation has an upward motion with a substantial vertical component of motion.

4. The apparatus as recited in claim 1, wherein, said first, second, third and fourth locations are so arranged that with said flap member moving from its stowed position toward an intermediate position between said stowed and fully deployed position, said instantaneous center of rotation moves in a direction having a substantial forward component of motion, and with said flap member closely approaching its fully deployed position, said instantaneous center of rotation has an upward motion with a substantial vertical component of motion.

5. The apparatus as recited in claim 1, wherein, with said flap member in its stowed position, said first and second locations are so arranged said first line which is drawn through said first and second location slants from said first location upwardly and forwardly, and the second line drawn through said third and fourth locations is more nearly vertical than said first line.

6. The apparatus as recited in claim 1, wherein said airfoil upper aerodynamic surface has an ideal aerodynamic contour, and said cove portion is deflected downwardly at an angle sloping downwardly and rearwardly from said ideal aerodynamic contour to meet said contact area of the upper flap surface at a location forward of a location at which said ideal aerodynamic contour meets said upper surface portion of the flap member.

7. The apparatus as recited in claim 6, wherein said first, second, third and fourth locations are so arranged that said instantaneous center of rotation is positioned above a center of curvature of said contact area at said contact location.

8. The apparatus as recited in claim 7, wherein said first, second, third and fourth locations are so arranged that with said flap member moving from its stowed position toward an intermediate position between said stowed and fully deployed position, said instantaneous center of rotation moves in a direction having a substantial forward component of motion, and with said flap member closely approaching its fully deployed position, said instantaneous center of rotation has an upward motion with a substantial vertical component of motion.

9. The apparatus as recited in claim 6, wherein said first, second, third, and fourth locations are so arranged that with said flap member moving from its stowed position toward an intermediate position between said stowed and fully deployed position, said instantaneous center of rotation moves in a direction having a substantial forward component of motion, and with said flap member closely approaching its fully deployed position, said instantaneous center of rotation has an upward motion with a substantial vertical component of motion.

10. The apparatus as recited in claim 6, wherein with said flap member in its stowed position, said first and second locations are so arranged said first line which is drawn through said first and second location slants from said first location upwardly and forwardly, and the second line drawn through said third and fourth locations is more nearly vertical than said first line.

11. The apparatus as recited in claim 1, wherein there is an intermediate mounting member moveably mounted to said mounting structure, the lower end of one of said links being mounted to said intermediate mounting member in a manner that movement of said intermediate mounting member causes a downward rotation of the forward end of said flap member so as to cause said contact area of the upper flap surface to move away from said rear cove portion to form a slot between said airfoil and said flap member.

12. The apparatus as recited in claim 11, wherein said intermediate mounting member is slideably mounted to said mounting member.

13. The apparatus as recited in claim 12, wherein said intermediate mounting member is mounted to the lower end of said rear link, and said intermediate mounting member is so arranged that rearward slide motion thereof moves said rear link rearwardly to cause downward rotation of the forward end of the flap member.

14. The apparatus as recited in claim 11, wherein said intermediate mounting member is pivotally mounted to said mounting member, said apparatus further comprising actuating means to move said intermediate mounting member about a pivot mounting thereof in a manner to cause downward rotation of the front end of the flap member.

15. The apparatus as recited in claim 14, wherein said intermediate mounting member is mounted to said mounting member at a fifth location, said fifth location being arranged so that with said flap member in its fully deployed position, said fifth location is positioned below the second line drawn between said third and fourth locations, said actuating means being so arranged that said intermediate member is moved downwardly to rotate the front end of flap member downwardly, whereby with said flap member in its fully deployed position, aerodynamic forces on said flap member tend to pull said intermediate mounting member in a direction opposite to that direction in which the intermediate mounting member moves to rotate the forward end of the flap member downwardly.

16. The apparatus as recited in claim 1, wherein:
  a. said airfoil upper aerodynamic surface has an ideal aerodynamic contour, and said cover portion is deflected downwardly at an angle sloping downwardly and rearwardly from said ideal aerodynamic contour to meet said contact area of the upper flap surface at a location forward of a location at which said ideal aerodynamic contour meets said upper surface portion of the flap member,
  b. said first, second, third and fourth locations are so arranged that said instantaneous center of rotation is positioned above a center of curvature of said contact area at said contact location,
  c. said first, second, third and fourth locations are so arranged that with said flap member moving from its stowed position toward an intermediate position between said stowed and fully deployed position, said instantaneous center of rotation moves in a direction having a substantial forward component of motion, and with said flap member closely approaching its fully deployed position, said instantaneous center of rotation has an upward motion with a substantial vertical component of motion.

* * * * *